United States Patent [19]

Roddeck et al.

[11] Patent Number: 4,658,648

[45] Date of Patent: Apr. 21, 1987

[54] METHOD OF AND APPARATUS FOR THE ULTRASONIC MEASUREMENT OF THE THICKNESS OF TEST ARTICLES

[75] Inventors: Werner F. Roddeck, Velbert; Heinz-Peter Schäfer, Wuppertal, both of Fed. Rep. of Germany

[73] Assignee: Karl Deutsch Prüf- und Messgerätebau GmbH & Co. KG, Wuppertal, Fed. Rep. of Germany

[21] Appl. No.: 763,810

[22] Filed: Aug. 8, 1985

[30] Foreign Application Priority Data

Aug. 9, 1984 [DE] Fed. Rep. of Germany ....... 3429409

[51] Int. Cl.⁴ ............................................. G01N 29/00
[52] U.S. Cl. .................................. 73/597; 328/129.1; 364/563
[58] Field of Search .......................... 73/597, 598, 629; 328/129.1; 367/108, 127; 364/563, 569

[56] References Cited

U.S. PATENT DOCUMENTS 4,388,830 6/1983 Narushima et al. .................. 73/597
4,471,657 9/1984 Voris et al. ........................... 73/597

OTHER PUBLICATIONS

Krautkramer et al., *Ultrasonic Testing of Materials*, 3rd. edn., Springer-Verlag, New York, 1983, pp. 278-286.

*Primary Examiner*—Stewart J. Levy
*Assistant Examiner*—John E. Chapman, Jr.
*Attorney, Agent, or Firm*—Toren, McGeady and Goldberg

[57] ABSTRACT

A method of measuring the thickness of test articles by pulse reflection ultrasonics, the length of time period as determined by the signal triggering the ultrasonic transmission and by an ultrasonic signal reflected at the end of the measurement path length being used to determine the distance travelled by the ultrasonics. In the method, the triggering signal for the ultrasonic transmitter is generated in phase with a measuring oscillation of a high and known frequency, whereafter the integral number of measuring oscillation pulses or waves which fit into a time period corresponding to measurement path length are counted, whereafter the measuring oscillation is so detuned that the residual measuring oscillation or wave found over and above that in the time period is reduced to zero and a correction value is derived from the amount of frequency detuning for the measurement path length resulting from the integral number of measuring oscillation pulses or waves. This method and apparatus make possible high accuracy of measuring while avoiding the disadvantages of analog circuit arrangements and while using a counting frequency usable by very low current CMOS components which can be used in portable battery-operated devices.

8 Claims, 2 Drawing Figures

METHOD OF AND APPARATUS FOR THE ULTRASONIC MEASUREMENT OF THE THICKNESS OF TEST ARTICLES

BACKGROUND OF THE INVENTION

1. Field of the Invention

The invention relates to a method of measuring the thickness of test articles by pulse reflection ultrasonics, the transit time as determined by the signal triggering the ultrasonic transmission and by an ultrasonic signal reflected at the end of the measurement path length, being evaluated as a measure of the distance travelled by the ultrasonics. The invention also relates to an apparatus for the performance of the method.

2. Description of the Related Art

The underlying principle of pulse reflection ultrasonic measurement of material thickness is as follows:

A test head coupled with the material surface either directly or via a buffer zone introduces an ultrasonic pulse into the material. The pulses reflected on the surfaces of the material are received by the test head at intervals of time which correspond to the distances travelled by the sound. These time intervals are measured as an indication of the distances travelled in them by the sound, such distance being calculable by reference to the speed of sound. The time count is made between the transmitted pulse and the rear wall echo pulse in the case of a direct introduction of the sound, whereas when a buffer zone is used, the surface echo is included in the measurement. To ensure that the voltage of the ultrasonic pulses to be evaluated is far enough away from background noise, in the conventional known measuring procedures, as are used in the thickness monitor 1214-1 produced by the firm Karl Deutsch Prüf und Messgerätebau Wuppertal, an adjustable fixed analog comparison threshold is set for each ultrasonic signal to be evaluated, and when such threshold is exceeded by the ultrasonic signal, the measuring operation starts and stops, the measured value of material thickness corresponding to the time elapsing between the starting and stopping of the measuring operation (see, for example, page 8, column 3 of the Prospectus P1140 of May, 1973, of the firm Karl Deutsch Prüf und Messgerätebau regarding ECHOGRAPH 1140).

The time measurements can be made in either analog or digital form. In analog measurements a voltage rising in proportion to time is delivered as a measurement value, the voltage subsequently being digitized. An example of apparatus which operates in such a manner is the thickness measuring apparatus sold under the description "General purpose thickness gage model 5222" by Panametrics, Inc. of Waltham, Mass. (USA). These methods, with the use of analog time measurement, offer the advantage of infinitely fine resolution, but their accuracy of measurement is limited by the instability of the analog components (temperature difference, offset and so on) and by the subsequent digitization of the measured value (limited number of counting steps), so that the precision obtainable with a single measurement is, at most, 0.1 mm. The measurement range which can be evaluated also limits measurement accuracy since a voltage range of, at most, 15 volts can be used as a time-proportional signal. Consequently, the conventional wall thickness measuring devices using analog time period measurement operate only up to a maximum measured path length of 100 mm.

For digital propagation time measurement, a digital propagation time counter is used having a resolution which depends upon the counting frequency selected. In most of the known measuring systems, frequencies of up to 30 MHz are used so that the resolution for a single measurement is also 0.1 mm.

There are no advantages in having a finer resolution since the accuracy of measurement depends to a large extent upon the amplitude and frequency of the ultrasonic signal, for the starting and stopping of the system depends upon when the rising edge of the evaluated ultrasonic oscillation exceeds the analog comparison threshold. Since pulse voltage amplitude depends not only upon coupling conditions but also upon the thickness of the material, it is impossible to guarantee that the phase of the ultrasonic oscillation is always the same when the fixed comparison threshold is exceeded; consequently, this reason also makes it impossible for measurement accuracy to be any higher than 0.1 mm for a single measurement, likewise with a digital travel time value as in the input of the above-mentioned thickness monitor 1214-1.

To reduce measurement inaccuracies caused by different phase relationships, measuring methods for static coupling were developed, with the measurement operation extending over a number of test cycles. In U.S. Pat. No. 4,388,830 to Narushima et al, such a method for measuring the thickness of test articles is disclosed wherein clock pulses are phase-shifted by a predetermined amount of $2\pi/N$ (where N is an integer not less than 2) upon completion of each measurement of the time period to improve accuracy. In these methods the analog or digital propagation time from a number of testing cycles is totalized, so that measurement accuracy is increased statistically in accordance with the number of testing cycles used. The aforementioned thickness measuring apparatus of Panametrics, Inc. is such an apparatus for static wall thickness measurement with analog time measurement. A method for enhancing accuracy by computational averaging computing is disclosed in U.S. Pat. No. 4,471,657 to Voris et al, in connection with a digital ultrasonic stress measuring apparatus. The disadvantage of these methods is that a large number of testing cycles are needed for a single measurement result, a factor which slows down the measuring operation. For dynamic thickness measurements in which the testing head and the test article move relative to one another at speeds of up to 3 meters/second, the varying coupling conditions and the fact that the pulse repetition rate is limited by the propagation time of sound, make it impossible to resort to measurements which extend over a number of cycles. By effecting the measurement of the elapsed time period with respect to a plurality of test cycles, measurement inaccuracies can be reduced, but not brought to zero.

It has already been suggested among experts that to compensate for phase error, the rising edge of the ultrasonic signal should start a first propagation time counter upon passing by the analog comparison threshold. The falling edge of the same half-wave starts a second propagation time counter upon passing the same comparison threshold. Similarly, the first counter is stopped by the rising edge of the next ultrasonic signal and the second counter is stopped by the descending edge of the latter signal. The two measured values of the counters are averaged and outputted as one measured value. It is alleged that with this method, if the digital propagation time counter has a counting frequency of more than 300

MHz, a measurement accuracy of more than 0.01 mm is possible. However, a major uncertainty of this method is that because of variations in the amplitudes of ultrasonic pulses consisting of more than a single oscillation, the fixed analog comparison threshold is not exceeded reliably by the first half-wave but may in some circumstances be exceeded by the higher second half-wave, with the result of a measurement error in the form of half the wavelength or a multiple thereof. Another disadvantage is the substantial outlay on counters, since two counters with subsequent averaging are needed for each wall thickness measured value.

A thickness-measuring method and apparatus are described in DE-OS-2853170 which can provide measurement accuracies of better than 0.01 mm in both static and dynamic testing despite fluctuations in ultrasonic signal amplitudes, that is, for heavily damped wide-band oscillators providing a single oscillation and for less attenuated narrow-band oscillators providing a number of oscillations, without measurement values being distorted by phase inaccuracies and phase jumps. In this method, the threshold values are derived automatically, in the form of a reference voltage lower by a preadjustable difference than the peak value of the first positive or negative half-wave of the two ultrasonic pulses between which it is required to make the time measurement, and the latter pulses are delayed and compared with the respective threshold derived from them, with the generation of control signals to set the measuring periods for the propagation time measurement.

Since in this known method only the pulses fitting integrally into the time period are counted, a counting frequency in the region of 300 MHz is necessary if the required accuracy of measurement is to be achieved. Circuit arrangements operating on frequencies as high as this are, because of their heavy current consumption, unsuitable for portable battery-operated devices.

SUMMARY OF THE INVENTION

It is the object of the invention to make possible a high measurement accuracy of 0.01 mm while obviating the conventional coupling with the maximum measurement path length and to obtain a fine resolution as with analog time measurement while avoiding the disadvantages of analog circuit arrangements, such as temperature drift, and dependence upon the supply voltage, by digital time measurement with the use of a counting frequency in the range of 10 MHz, a frequency which can be dealt with even by the very low-current CMOS components, so that a measurement accuracy of 0.01 mm over measurement path lengths of considerably more than 100 mm, can be provided even by portable battery-operated equipment.

According to the invention, the triggering signal for the ultrasonics transmitter (1, 2) is generated in phase with a (pulse) oscillation which is generated by a voltage controlled measuring oscillator (6) and which is of a high and known frequency (of approximately 10 MHz). This oscillation:

Is combined in a first measuring step, with the time period signal (A) corresponding to the measurement path length, with detection and counting of the integral number of measuring oscillation pulses or waves fitting into the time period (A). Thereafter, in a second step, the phase difference between the negative edge of the period and the immediately following pulse or wave edge of the measuring oscillation, is detected and used as a control parameter to detune the measuring oscillator (6) in order to reduce the phase difference to zero. This detuned measuring oscillation is combined with a known second time period signal of a fixed predetermined duration, with detection of that integral number of pulses or waves of the detuned measuring oscillation (B') which fits into the latter slot signal. Thereafter, the frequency of the detuned measuring oscillation is calculated and, from its deviation from the original frequency of the measuring oscillator (6), a correction value is derived for the measurement path length resulting from the number of pulses or waves calculated in the first measuring step. This correction value is factored in the measurement path length.

BRIEF DESCRIPTION OF THE DRAWINGS

The invention will be described hereinafter with reference to an embodiment shown in the drawings, wherein.

DESCRIPTION OF THE PREFERRED EMBODIMENT

Figure 1:
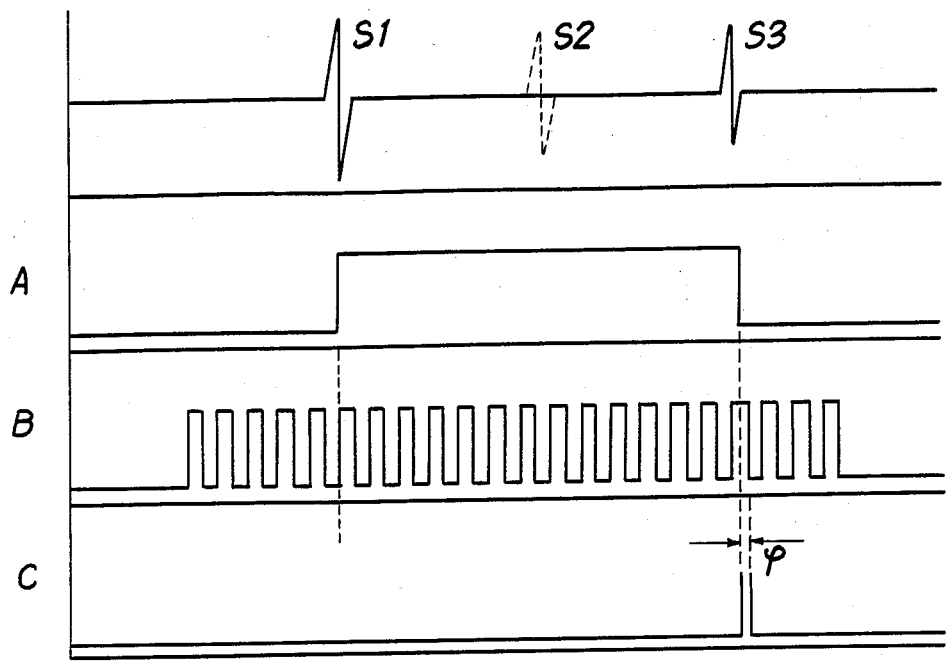
FIG. 1 is an illustration in graph form, of ultrasonic signals, the measuring time period signal A, the measuring oscillator oscillation B and the phase difference between the signals A and B.
Figure 2:
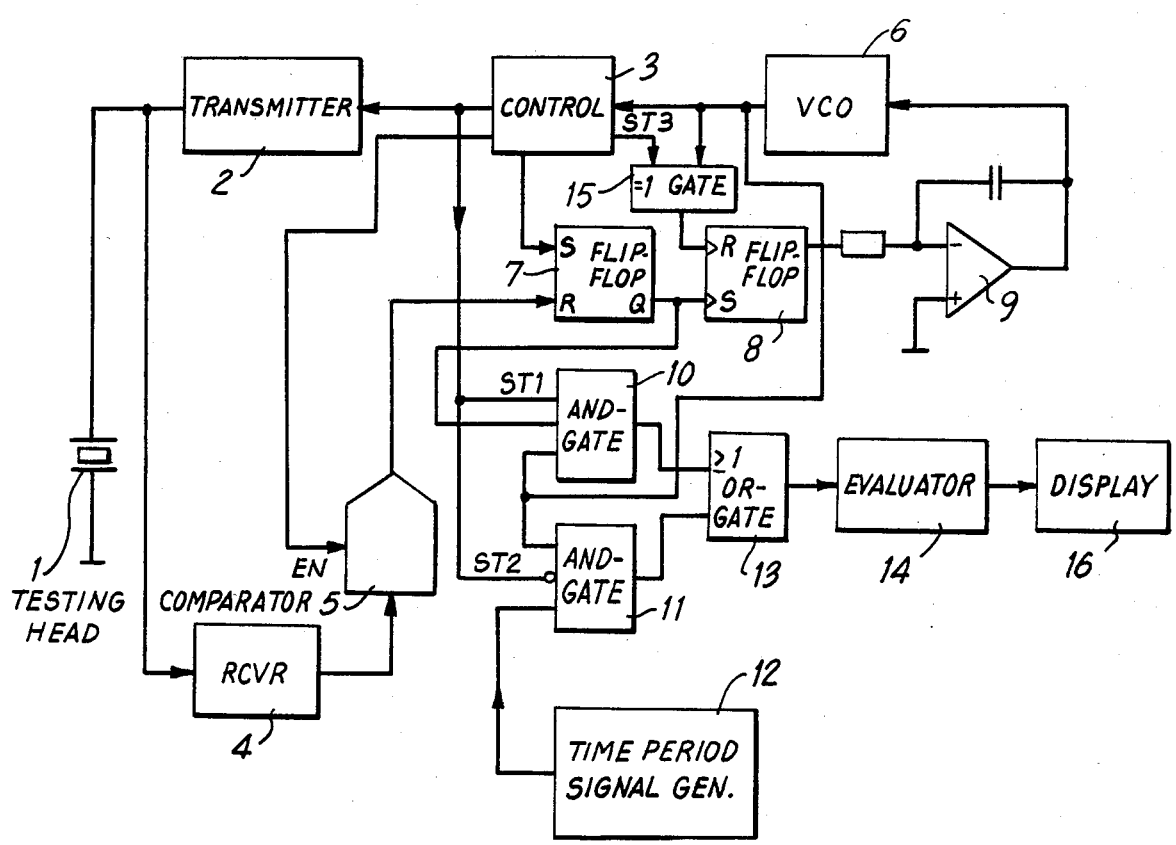
FIG. 2 is a block schematic diagram of an embodiment of an apparatus according to the invention.

The apparatus illustrated is a pulse reflection system with a wide-band ultrasonic testing head 1. The transducer of head 1 is excited by a transmitter 2 which, upon receipt of a transmission-triggering signal from a control 3, generates a brief high-voltage pulse. Consequently, the head 1 transmits ultrasonic oscillations S1 which enter the test article, pass there-through and are reflected on the back wall of the article. The reflected ultrasonic signal returns to the head 1 and the transducer thereof converts this reflected signal back into an electrical signal S2 by piezoelectric effect. The time between transmission of the pulse S1 and entry of the reflected pulse in the head 1—i.e., the propagation time of sound—corresponds to twice the wall thickness of the test article and will be referred to hereinafter as the measurement path length. The pulse S2 is amplified in a receiver 4 and supplied to a comparator 5 which is disposed after the receiver 4 and in which the pulse S2 is compared with a predetermined threshold value. When the pulse S2 exceeds the latter value, the output of the comparator 5 changes over and therefore generates a signal whose processing will be described hereinafter.

A voltage-controlled measuring oscillator 6 (VCO) produces high-frequency pulses in the range of 10 MHz (rectangular oscillation B) and the latter pulses are supplied to the control 3. The control 3 generates the transmission-triggering signal for the transmitter 2 synchronously with a positive edge of output signal B of oscillator 6 and simultaneously, a signal which is supplied to the set input of an RS flip-flop 7, the latter signal setting the flip-flop 7. The flip-flop reset input is connected to the output of the comparator 5 which resets the flip-flop upon the arrival of an output signal. Consequently, there is present at the output Q(7) of the flip-flop 7, a signal A which has a positive edge in phase with the signal B and which corresponds to the time between transmission of the pulse S1 and appearance of the pulse S2—i.e., to the propagation time of sound and, therefore, to (twice) the wall thickness of the test article, and is therefore a yardstick for such thickness. The signal A will hereinafter be called the measuring time period. Determination of its length enables the thickness of the test article to be determined.

The oscillation B of the measuring oscillator 6 is used to count out the time period A. Accordingly, the oscillation B is supplied to two parallel-connected and-gates 10, 11 whose output is connected to an or-gate 13, which transmits the measured values supplied to it to an evaluator 14 to which a display 16 is connected.

In addition to the signal B, the time period signal A of the flip-flop 7 is supplied to the gate 10, while a generator 12, producing a time period signal of a known and substantial duration >1 ms, is also connected to the gate 11. The two signals thus supplied are combined in the gates 10 and 11, respectively, so that only the counting pulses present in the signal A and in the time period signal of the generator 12, respectively, are supplied to the evaluator 14.

A first measuring step to determine the length of the time period A, is carried out by means of the gate 10, the setting of which initiates the step and the resetting of which terminates the step. In the first measuring step, the integral number of pulses of the oscillation B which fit into the time period A are counted out.

The gate 11 performs the second measuring step together with a edge-triggered flip-flop 8 which is set by output Q(7) of flip-flop 7 and which is reset by that edge of a pulse of the signal B which immediately follows the negative edge of the signal A, so that a signal C is present at output Q(8) of flip-flop 8, the latter signal corresponding to the phase difference $\phi$ between the time period signal A and the signal B at the end of the time period. The signal C is supplied to an integrator 9 and converted therein to a voltage which is proportional to $\phi$ and which is supplied as a control signal to the control input of oscillator 6 and which so detunes the output frequency thereof as to reduce the phase difference $\phi$ to zero.

Measuring operations are controlled by means of the following signals of the control 3:

A control signal which, as signal St 1, has an "enable" function for the gate 10, and, as signal St 2, has a "disable" function for the gate 11 during the first phase of measurement, and whose functions are the converse in the second phase of measurement. When measurement is by direct contact, the enable signal in the first phase of measurement is operative for the comparator 5;

A control signal St 3 which is supplied to a gate 15 preceding the flip-flop 8 on the input side, the gate 15 also receiving the (detuned) oscillation B and determining whether the flip-flop 8, having been set by the negative edge of the signal A, is being reset by a positive edge or by a negative edge of the (detuned) oscillation B.

Measurement proceeds as follows:

The ultrasonic signal, which is produced in phase with the oscillation B and in synchronism with whose generation the flip-flop 7 is set, passes through the test article, is reflected on the back wall thereof, and returns to the head 1 whence it goes to the receiver 4 and is amplified therein. The amplified signal goes to the comparator 5 and causes the output thereof to change over so that flip-flop 7 is reset. Flip-flop output Q(7) therefore presents a time period signal A which corresponds to the test-piece wall thickness and which can be evaluated by means of the measuring oscillation B.

During the first phase of measurement, under the control of the signal St 1, the signal A is combined with the oscillation B in the and-gate 10 and only the oscillation B pulses present in the time period A go through or-gate 13 to the evaluator 14 to be counted.

The second phase of measurement is initiated by the setting of the flip-flop 8 by means of the negative edge of the time period signal A from flip-flop output Q(7). Under the control of the signal St 3, the flip-flop 8 is reset by that edge of the signal B which immediately follows the negative edge of the signal A, the flip-flop 8 therefore producing a phase-adjusting signal C which corresponds to the phase difference between the signals A and B at the end of the measurement time period and which is converted in integrator 9 into a voltage for detuning the measuring oscillator frequency so as to reduce the phase difference $\phi$ to zero.

Under the control of the signal St 2, the detuned signal B' is combined in the flip-flop 11 with the time period signal produced by the generator 12 and only those pulses of the signal B' which are present in the penultimately mentioned signal go through the gate 13 to the evaluator 14 for counting out.

The evaluator 14 comprises a counter for counting out the pulses supplied by the gate 11 and a plurality of stores in which the frequency of the signal B in the first measurement phase, the duration of the pulse produced by the generator 12, and the value of the speed of sound are or will be stored as fixed data. The frequency of the detuned signal B' (second phase of measurement) can be determined by counting the pulses detected in the second phase of measurement and combining the value thus obtained with the stored duration of the signal produced by the generator 12. A comparison of this frequency with the measuring frequency in the first phase of measurement gives the value of the phase difference $\phi$. The complete measurement result therefore comprises, in combination, the number of signal B pulses counted in the first measurement phase and the value of $\phi$. By factoring in the speed of sound, the distance travelled by the second in mm can be found and displayed on the display 16.

All the control and computing events hereinbefore described, the storage of the fixed data and speed of sound, and the display control can be performed very advantageously by a microcomputer.

The apparatus can also be used to measure wall thickness in association with a wide-band ultrasonic testing head and a buffer zone which can take the form of a liquid (dip technique) or a solid. This technique is used more particularly to measure the wall thickness of thin-walled articles, a first echo arising from the boundary surface between the buffer zone and the article and a second echo from the article back wall. The sound propagation time it is required to know between the article surface and the rear wall is the difference in sound propagation times between the triggering of the transmitted pulse S1 and the arrival of the second echo S2 (back wall echo) and the triggering of S1 and the arrival of the first echo. These two sound paths can be measured individually by means of the method according to the invention and of the apparatus hereinbefore described. To this end, in the measurement of the path bounded by the rear wall echo in the first phase of measurement, the comparator 5 must be disabled by means of the control 3 by way of the enable input until after the arrival of the first echo, to ensure that the time period A is reset only by the second echo.

We claim:

1. A method of measuring the thickness of test articles by pulse reflection ultrasonics, the length of a time period as determined by a signal triggering the ultrasonic transmission and by an ultrasonic signal reflected at the end of the measurement path length being used to determine the distance travelled by the ultrasonic signal, characterized in that the triggering signal for the ultrasonic transmitter is generated in phase with a measuring oscillation (B) which is generated by a voltage-controlled measuring oscillator and which is of a high and known frequency, which oscillation is combined, in a first measuring step, with a time period signal (A) corresponding to the measurement path length, with detection and counting of the integral number of measuring oscillation pulses or waves fitting into the time period (A) whereafter;

in a second measuring step, the phase difference between the negative edge of the time period and the immediately following pulse or wave edge of the measuring oscillation is detected and used as a control parameter to detune the measuring oscillator in order to reduce the phase difference to zero, and a resulting detuned measuring oscillation is combined with a known second time period signal of a predetermined duration with detection of that integral number of pulses or waves of the detuned measuring oscillation (B') which fits into the latter time period signal;

whereafter the frequency of the detuned measuring oscillation is calculated and from its deviation from the original frequency of the measuring oscillator, a correction value is derived for the measurement path length resulting from the number of pulses or waves calculated in the first measuring step, the correction value being factored in the measurement path length.

2. A method according to claim 1, characterized in that a buffer zone is used and the propagation time for the back wall echo is first calculated by means of the method according to claim 1 whereafter the propagation time for the surface echo is calculated by the method according to claim 1 and the two propagation times are subtracted from one another.

3. An apparatus for measuring the thickness of test articles by pulse reflection ultrasonics, the apparatus having an ultrasonic transmitter and ultrasonic receiver with an amplifier, disposed thereafter, a comparator for comparing ultrasonic echo pulses with a predetermined threshold value, the comparator responding to the passing of the threshold value by generating a control signal for a subsequent facility for generating a measurement time period corresponding to measurement path length, the facility being enabled by a control signal synchronous with the signal for triggering the ultrasonic transmission, the apparatus also having means for determining the length of said time period, characterized in that said apparatus further comprises:

a voltage-controlled measuring oscillator for generating measuring oscillations (B, B') of a high frequency, in the range of 10 MHz;

two sequentially enableable logic elements connected in parallel between the oscillation output of the measuring oscillator and the determining means, one of said logic elements also being connected on the input side to the facility for generating the measurement time period signal (A) while the other of said logic elements is also connected on its input side to an output of a generator for generating a known time period signal having a duration greater than 1 ms;

a gate and integrator arrangement connected between the oscillation output of the measuring oscillator and a control input thereof and settable by a negative edge of the time period signal (A) and resettable by an immediately following edge of the measuring oscillation (B) and serving to generate a signal (C) which corresponds to the phase difference between the time period signal (A) and the measuring oscillation (B) at the end of the time period in order to detune the measuring oscillator to a frequency (B') reducing the phase difference to zero;

a control for triggering the transmitter and setting the facility in phase with the measuring oscillation (B), for alternate enablement of the logic elements and to determine whether the phase signal (C) is to be terminated by a positive edge or a negative edge of the measuring oscillation (B);

a counter in the determining means for counting the pulses received by the logic elements; storage means for storing the measuring frequency (B) of the undetuned measuring oscillator, the length of the known time period signal and the speed of sound;

means for combining the stored values and the measured values to determine measurement path length; and a display for displaying measurement path length values.

4. An apparatus according to claim 3, characterized in that the control can generate a signal for disabling the comparator until after the arrival of a first ultrasonic echo signal.

5. An apparatus according to claim 3 or 4, characterized in that said apparatus comprises an RS flip-flop for generating the time period signal (A), the flip-flop being settable by the control synchronously with the triggering of the transmitter and being resettable by the comparator, an output of the flip-flop being connected to said one logic element and to the arrangement for generating the phase difference signal.

6. An apparatus according to claim 3 or 4, characterized in that the logic elements are two and-gates with outputs thereof being connected to an or-gate.

7. An apparatus according to claims 3 or 4, characterized in that said arrangement comprises a edge-triggered flip-flop for generating the phase-adjusting signal (C).

8. An apparatus according to claim 3 or 4, characterized in that said apparatus comprises a microcomputer for performing the functions of the control and of the determining means.

* * * * *